United States Patent [19]

Bergmann

[11] Patent Number: 5,872,878
[45] Date of Patent: Feb. 16, 1999

[54] PARTIAL OPTICAL CIRCULATORS

[75] Inventor: Ernest Eisenhardt Bergmann, Fountain Hill Borough, Pa.

[73] Assignee: Lucent Technologies Inc., Murray Hill, N.J.

[21] Appl. No.: 847,543

[22] Filed: Apr. 10, 1997

[51] Int. Cl.⁶ .............................. G02B 6/26; G02B 5/30
[52] U.S. Cl. .................... 385/15; 385/11; 385/16; 385/18; 385/24; 359/483; 359/494; 359/497
[58] Field of Search ............................. 385/11, 15, 16, 385/17, 18, 20, 24; 359/483, 484, 494, 497, 489

[56] References Cited

U.S. PATENT DOCUMENTS

| | | | |
|---|---|---|---|
| 4,859,014 | 8/1989 | Schmitt et al. | 385/11 X |
| 5,204,771 | 4/1993 | Koga | 359/281 |
| 5,428,695 | 6/1995 | Ohta | 385/14 |
| 5,471,340 | 11/1995 | Cheng et al. | 359/281 |
| 5,734,763 | 3/1998 | Chang | 385/11 |
| 5,768,005 | 6/1998 | Cheng et al. | 359/281 |

OTHER PUBLICATIONS

High–Isolation Polarization–Insensitive Optical Circulator for Advanced Optical Communication Systems, Journal of Lightwave Technology, vol. 10, No. 9, Sep. 1992, pp. 1210–1216.

*Primary Examiner*—Brian Healy

[57] ABSTRACT

A partial optical coupler of the present invention comprises first, second and third walk-off devices having a non-reciprocal polarization interchanger unit positioned between the first and second and the second and third walk-off devices. The first and third walk-off devices are matched in terms of the amount of walk-off and the direction of walk-off. A further embodiment includes a reflector which allows the light beam to pass through each walk-off device and each non-reciprocal polarization interchanger unit twice.

18 Claims, 3 Drawing Sheets

5,872,878

PARTIAL OPTICAL CIRCULATORS

FIELD OF THE INVENTION

This invention relates generally to the field of optical devices and more particularly to optical devices, such as circulators, isolators and switches, that are used in optical communications systems.

BACKGROUND OF THE INVENTION

Optical communications systems, as well as other optical technologies, require apparatus that manipulates optical signals that are in the form of light rays. One of the best known apparatus for such manipulation is the silica based optical fiber which is widely used for both short and long distance optical transmission. Additionally, other well known apparatus include couplers and multiplexers that have been developed to couple one or more optical signals into one or more optical fibers or waveguides. Some applications for transmission of optical signals also desirably use non-reciprocal apparatus or devices, where the propagation characteristics of light within the apparatus depends upon the direction of light propagation within the apparatus.

One type of such non-reciprocal apparatus, commonly referred to as an optical isolator, permits light to pass through the apparatus in one direction but not in the reverse direction. Another type of such non-reciprocal apparatus is termed an optical circulator. An optical circulator has 3 or more ports which permit light to pass from a first to a second port, for example, but not from the second port to the first port. Instead light entering the second port passes to a third port. If there is a fourth port, then light entering the third port exits at this fourth port. Generalizing, port n → port (n+1) if ports n and (n+1) exist. A partial circulator is a circulator as described above but where port $n_{max}$ does not lead to port 1. A complete or full circulator couples light entering port $n_{max}$ to port 1. An isolator may be thought of as a two port partial circulator. However, the term isolator is the preferred term.

Many types of optical devices, including circulators and isolators, have been developed for commercial applications. For many applications, such a device should be polarization independent to the external world; that is, device operation should not depend upon the polarization of the incoming light. For example, Fujii in Journal of Lightwave Technology, Vol. 10, pp. 1226–1229, September 1992, describes a polarization independent apparatus that as stated can be used as an optical circulator. Although stated to be useful over a wide range of wavelengths, preferred operation of the apparatus depends upon precise orientation of the components with respect to each other. Another optical circulator is described in U.S. Pat. No. 5,204,771 issued to Koga on Apr. 20, 1993. The essence of the Koga circulator appears to be the use of a birefringent plate followed by non-reciprocal optical rotators. The birefringent plate splits the incoming beam into two parallel beams, and the optical rotators change the polarization of each of the two beams by 45 degrees so that there are two parallel beams with orthogonal polarization.

Consideration of the devices described in the previous paragraph reveals aspects that make their use disadvantageous in some situations. As mentioned, the Fujii circulator depends upon precise relative orientation of the components. This orientation may be difficult to achieve in practice and still more difficult to maintain for extended periods of time. The Koga device is extremely complicated. The complexity arises not only because there are many components, where the individual components are made up of multiple connected plates, but also because the large number of components necessarily has a large number of surfaces. Any one of these surfaces can produce undesired reflections. The devices must be designed to either eliminate the reflections or to compensate for them. Additionally, the optical rotators must be precisely aligned so that one beam passes through the top half of the rotator and the other beam passes through the bottom half of the rotator. The small beam sizes and small separation of the beams will likely make this difficult. Accordingly, there is a need for an optical circulator device which is simpler to manufacture and maintain than those devices found in the prior art.

SUMMARY OF THE INVENTION

According to one advantageous embodiment of the invention an optical apparatus of the present invention comprises first, second and third walk-off devices having a polarization interchanger unit positioned between the first and second walk-off devices and the second and third walk-off devices. The first and third walk-off devices are matched in terms of the amount of walk-off and the direction of walk-off. A further embodiment includes a reflector which allows the light beam to pass through each walk-off device and each polarization interchanger unit twice.

BRIEF DESCRIPTION OF THE DRAWINGS

A more complete understanding of the present invention may be obtained from consideration of the following description in conjunction with the drawings in which.

DETAILED DESCRIPTION

Figure 1:
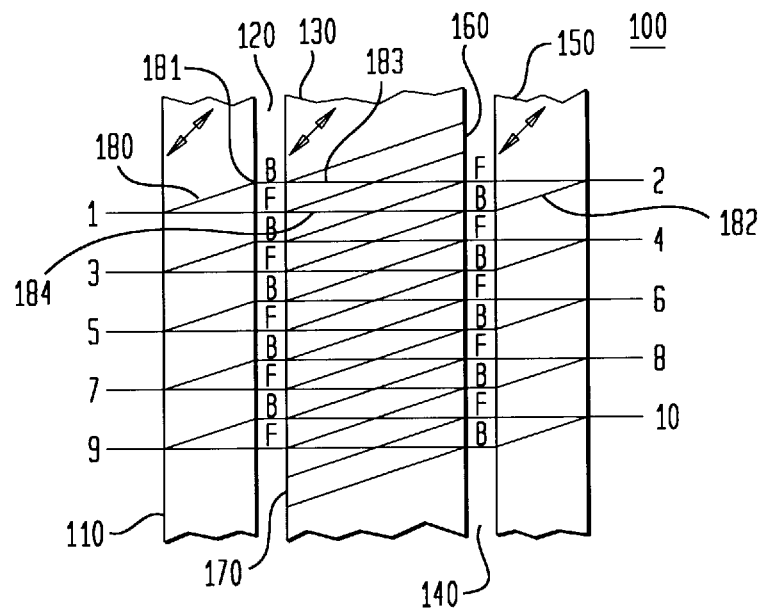
FIG. 1 is a top view of an embodiment of a partial circulator in accordance with the present invention.

Referring to FIG. 1, there is shown an exemplary embodiment of a partial optical circulator 100 in accordance with the present invention. As shown, partial optical circulator 100 is comprised of a first walk-off device 110, a second walk-off device 130 and a third walk-off device 150. A first non-reciprocal polarization interchanger unit 120 is disposed between first walk-off device 110 and second walk-off device 130 and a second non-reciprocal polarization interchanger unit 140 is disposed between second walk-off device 130 and third walk-off device 150. In general, walk-off devices can either separate an incoming unpolarized light beam into parallel outgoing beams of orthogonal polarization or combine incoming parallel beams of orthogonal polarization into an unpolarized light beam. For example, walk-off devices split an incoming light beam into "ordinary" and "extraordinary" beams which are designated as O and E polarized beams, respectively. Walk-off devices may be fabricated from birefringent materials such as calcite or rutile and also by use of polarization separation coatings. As explained below, the term non-reciprocal polarization interchanger, in general, is intended to cover a wide variety of devices which transform polarization from one state to another for beam propagation in one direction and not transform in the same manner for beam propagation in the reverse direction. For example, a non-reciprocal polarization interchanger can be an odd-multiple half wave plate, a half wave plate, combinations of Faraday rotators (each of which rotate the plane of polarization±45°) or any other 90° rotators. The materials and methods for making the walk-off device and the non-reciprocal polarization interchange units are well known and can be readily fabricated by those skilled in the art.

Although partial optical circulator 100 is shown in FIG. 1 as having ports 1, 2, 3 . . . 10, it would be understood that the number of ports is arbitrary and can be either an even or odd number of ports. For example, the number of ports could be three. In general, an unpolarized light beam entering at port 1 will emerge at port 2 as an unpolarized beam. An unpolarized beam entering at port 2 will emerge as an unpolarized beam at port 3, etc. In other words, light entering ports 1–9 will emerge at ports 2–10. Note that there is no facility in this arrangement for light entering at some port and emerging at port 1 or for entering at port 10 and emerging at some port. This is indicated in FIG. 1 by unused path 160 and lost path 170, respectively. Thus partial optical circulator 100 differs from a full circulator in that the circular path is broken. As would be understood, a N port partial circulator can be converted into a full N-2 port circulator by connecting port N to port 1 using, for example, mirrors, lenses and/or fiber. The full N-2 port circulator would then utilize ports 2, 3, . . . (N-1) for optical communications purposes.

As is evident from FIG. 1, horizontally directed, unpolarized light beams will enter and leave ports 1, 2, . . . N. However, the unpolarized light beam undergoes separation and then combination prior to emerging at the destination port. The above preferably should be accomplished with minimum polarization mode dispersion ("PMD"). Minimizing PMD requires that the two alternate polarization related optical paths are equalized in their optical delay. The most straight forward means to achieve this is to use symmetry. A method that does not use symmetry requires that the F and B sections, comprising the polarization interchanger units as described below, have unequal delays to compensate for unequal paths produced by the choice of and orientation of the first and third walk-off devices 110 and 150, respectively. However, this method is more complex and is not generally preferred if symmetry can be used.

In order to ensure that PMD is minimized between the input beam and output beam, first walk-off device 110 and third walk-off device 150 must be matched in the magnitude of the walk-off the beam will experience and in the walk-off sense of direction, where the latter term refers to a binary sense of direction. That is, whether the walk-off devices have, for example, a top/down, or right/left walk-off sense of direction. In contrast, a walk-off direction refers to having the same magnitude relative to a line. For example, if a light beam enters port 1 and leaves at port 2, minimal PMD will result if the paths followed by the now split light beam forms a parallelogram 180 and that units 120 and 140 form equivalent delays for equivalent regions (B, F). That is, if the amount of walk-off or the magnitude of walk-off in first walk-off device 120 and third walk-off device 150 is equal, then divergent path 181 and convergent path 182 will also be equal and the resulting shape, together with parallel paths 183,184, will form parallelogram 180. If first walk-off device 110 and third walk-off device 150 are not matched, then a trapezoidal path shape results, which may correspond to greater PMD. Note that having equal walk-off magnitudes does not mean that the dimensions of first walk-off device 110 and third walk-off device 150 have to be equal. The dimensions of each walk-off device could be different, depending upon the material used for fabricating the specific walk-off device. As would be understood, the fabrication materials used, as well as the direction of their optic axis orientation, each have different walk-off characteristics. As long as the magnitude of the walk-off, which is a combination of the material, its orientation and the dimensions of the material, is equivalent in terms of walking apart and walking toward each other then proper recombination of both polarization paths is achieved. Summarizing, there are two issues that must be addressed. First, the two polarization paths must be recombined such that good coupling is achieved for both polarizations simultaneously. If not, there is a potential for recombining mismatch. Assuming that the first issue is addressed, then, secondly, the two optical path lengths preferably should be matched or made equal, i.e., PMD =0, since the PMD is proportional to the difference in the optical path lengths. Note that in FIG. 1, the plane of the page contains the walk-off directions of the first walk-off device 110, the second walk-off device 130 and the third walk-off device 150.

First non-reciprocal polarization interchanger unit 120 and second non-reciprocal polarization interchanger unit 140 are, for example, combinations of Faraday rotators, which rotate the plane of polarization ±45°, and reciprocal elements, such as suitably oriented half wave plates or optically active materials, e.g., a crystalline quartz along its optic axis. These combinations are labeled in FIGS. 1 and 2 as "F" and "B", which describe two types of behavior, as explained further below. A polarized light beam, with either E or O polarization, emerging from walk-off device 110 and traveling left to right through an F combination will not undergo any polarization change due to the F combination prior to entering second walk-off device 130. However, due to the non-reciprocal nature of Faraday rotators, an E or O polarized light beam traveling right to left through the F combination will undergo a polarization change. That is, an E or O polarized light beam will become an O or E polarized light beam, respectively. In a similar but opposite manner, the B combination will effect the light beam's polarization when traveling in a left to right direction, but will not effect the polarization when traveling from a right to left direction.

Figure 2:
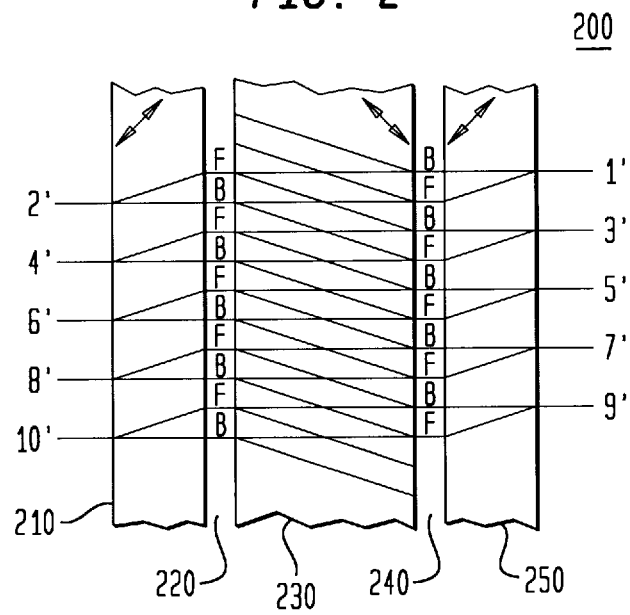
FIG. 2 is a top view of another embodiment of a partial circulator in accordance with the present invention.

Referring now to FIG. 2, a partial optical circulator 200 is shown in accordance with the present invention. In a similar manner to partial optical circulator 100, partial optical circulator 200 comprises a first walk-off device 210, a second walk-off device 230 and a third walk-off device 250. As above, a first non-reciprocal polarization interchanger unit 220 and a second non-reciprocal polarization interchanger unit 240 are disposed between first and second walk-off devices 210 and 230 and second and third walk-off devices 230 and 250, respectively. In this configuration, the positioning of the F and B combinations in first and second non-reciprocal polarization interchanger units 220 and 240 are reversed as shown in FIG. 2. This change reflects the fact that the optical axis of second walk-off device 230 has been inverted with respect to second walk-off device 130 of FIG. 1. In other words, the embodiment of FIG. 1 illustrates the case where the E polarized light beam travels in the same walk-off sense of direction in each walk-off device and FIG.

2 illustrates the case where the E polarized beam travels in the other walk-off sense of direction in the second walk-off device.

Although the following discussion is with respect to FIG. 1, it would be understood that the discussion is equally applicable to the embodiment shown in FIG. 2. Referring now to FIG. 1, a light beam entering at port 1 of first walk-off device 110 separates into two polarization components, E and O polarization, which are walked far enough apart so that the two resulting paths can be treated differently. The E polarized light beam travels through the B combination and by the assumptions made above, gets converted to the O polarization. As a result, both beams are incident upon second walk-off device 130 as O polarized light beams and travel horizontally through second walk-off device 130 in parallel paths. As the O polarized light beams exit second walk-off device 130, the originally O polarized light beam gets converted by an B combination to E polarization prior to entering third walk-off device 150 and the previously converted O polarized light beam remains the same as it passes through an F combination. Third walk-off device 150 walks the two light beams with opposite polarization towards each other so that they converge to a common position and emerge at port 2 as an unpolarized light beam.

As shown below, an unpolarized light beam entering at port 2 does not emerge at port 1, but does emerge as an unpolarized light beam at port 3. Note that a structure with this functionality (ignoring port 3) is generally referred to as a two-stage isolator(s). The isolation finctionality results because a light beam entering at port 2 does not retrace a path to port 1 due to the non-reciprocal nature of non-reciprocal polarization interchanger unit 140 (and also unit 120). As the two beams pass through non-reciprocal polarization interchanger unit 140, the O polarized light beam is converted to an E polarized light beam by an F combination and the E polarized light beam remains the same as it passes through an B combination. As a result, both beams are incident upon second walk-off region 130 as E polarized light beams. The two light beams will travel parallel paths through second walk-off device 130 which walk away from port 1 and walk toward port 3. It is "two-staged" in that light entering at port 2 should be converted solely to E polarization by polarization interchanger unit 140 and hence lead to isolation by the walk-off direction in walk-off device 130. Trace amounts of O polarization, due to imperfect polarization in interchange unit 140, will travel toward port 1 through walk-off device 130. However, polarization interchanger unit 120 converts the current polarization so that the light leads away from port 1 when it is traversing walk-off device 110, thus resulting in a second stage of isolation. Upon leaving second walk-off device 130, the originally E polarized light beam passes through an F combination and changes to O polarization and the converted E polarized light beam remains the same as it passes through an B combination. The oppositely polarized light beams are converged to a point by first walk-off device 110 and emerge at port 3. As it would readily apparent, this process can continue from port 3 to port 4 in a manner analogous to the ray tracing for port 1 to port 2. Similarly light beams going from port 4 to port 5 would be analogous to the port 2 to port 3 path. This process continues until the highest numbered port is reached.

Figure 3:
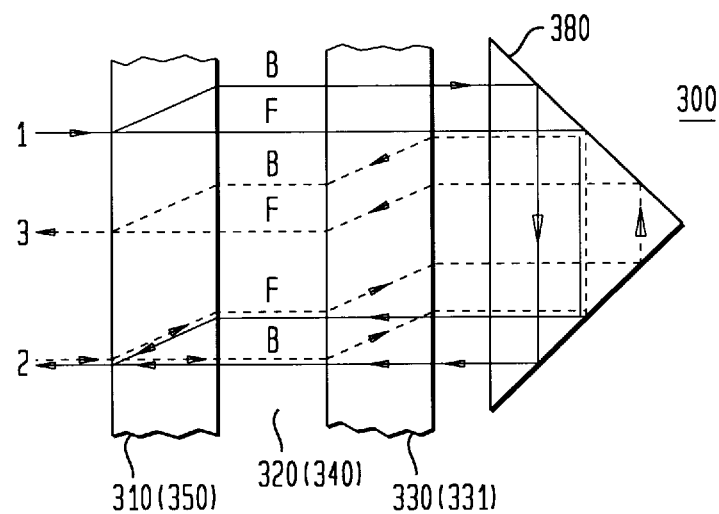
FIG. 3 is a sectional view of an embodiment of a reflexive partial circulator in accordance with the present invention.

Referring now to FIG. 3, a reflexive partial optical circulator 300 is shown in accordance with the present invention. This embodiment is implemented by folding the embodiments illustrated in FIG. 1 and FIG. 2 or by substituting other walk-off devices. As shown in FIG. 3, folding is accomplished by, for example, subdividing second walk-of device 130 into two equal pieces 330,331 and using, for example, a porro prism 380 to pass the beams through first and third walk-off devices 310,350 and through first and second non-reciprocal polarization interchanger unit 320, 340 twice. As it would be understood, a mirror arrangement or other similar device could be used to pass the light beams through each of the devices twice as required. In this embodiment, although the length of the required material is halved, the width of the remaining material is doubled since all of the ports are on the same side.

In the actual implementation of the device of FIG. 3, the walk-off angles of the birefringent materials are much smaller than as illustrated, so that there would be less vertical separation of the ports and/or greater thickness for the birefringent plates. Reflexive partial optical coupler 300 operates as before, where the solid lines are used to trace a light path from port 1 to port 2 and the dotted lines are used to trace a path from port 2 to port 3. For sake of clarity, the dotted lines are displaced in FIG. 3 where they would overlap solid line paths traveling in the opposite direction. Although a three port reflexive partial optical circulator is shown in FIG. 3, it would be understood that additional ports can be added if space permits. As it would be understood, porro prism 380 and walk-off device 330,331 could be integrated to form a single unit. In a further embodiment, the ports could interdigitate, but with an increased risk in cross coupling.

Figure 4:
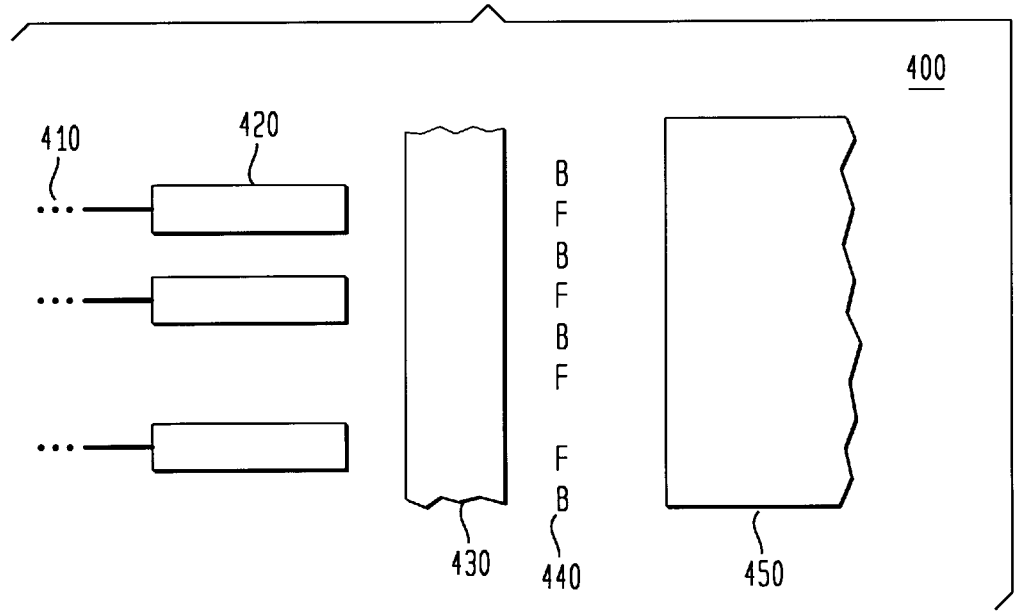
FIG. 4 is a sectional view of an embodiment of a fiber-dual parallel beam converter in accordance with the present invention.

Referring to FIG. 4, a fiber optic-dual parallel beam converter 400 is shown in accordance with the present invention. This optical device permits conversion between fiber optic input/output lines and parallel traveling beams with parallel linear polarization. Although not explicitly detailed in FIG. 4, the conversion from collimated beams to fiber optics can be accomplished using a lensing system, such as a GRIN, or a spherical or aspheric lens. A disadvantage of converter 400 is the overall length of the optical device, which includes the ends of fiber optic pigtails 410, collimating optics 420, full length of walk-off section 430, non-reciprocal polarization interchanger unit 440 and a remaining portion of the optical system 450. Remaining portion of optical system 450, for example, could have the arrangement as shown in FIG. 3, it could have a reflexive configuration where porro prism 380 and walk-off device 330,331 are an integrated unit, or remaining portion of optical system 450 could have an arrangement analogous to that shown in FIG. 7, which, for instance, has a horizontal discontinuity between plates 710 and 720. Referring now to FIGS. 5(a), 5(b), 6(a) and 6(b), by using a reflexive configuration for walk-off section 430, a reduction is realized in the overall size of the optical device. This length reduction has the advantage of decreasing chances of mis-alignment due to warpage of the package, where warpage tends to increase with increasing package length. A further advantage is that the dimensions of the birefringent material are reduced and therefore there is also a corresponding reduction in the volume of the optical system package.

Figure 5A:
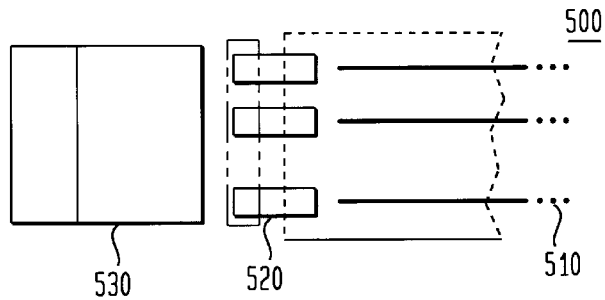
FIGS. 5(a) and 5(b) show top and side views of an embodiment of a reflexive fiber-dual parallel beam converter in accordance with the present invention.
Figure 5B:
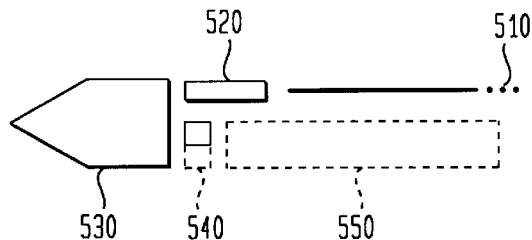
Figure 6A:
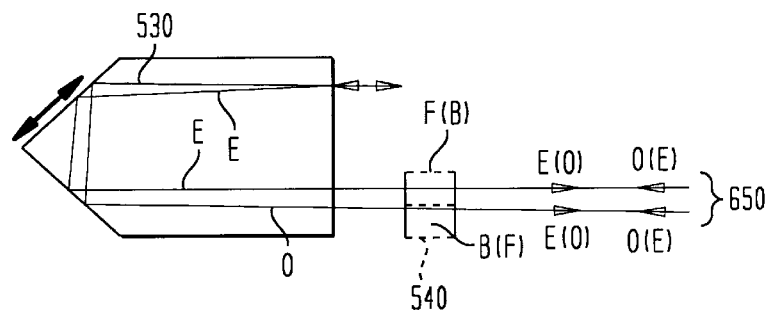
FIGS. 6(a) and 6(b) show side views of ray tracings of detailed embodiments as shown in FIG. 5(a); and FIG.(7) is a sectional view of another embodiment of the present invention.
Figure 6B:
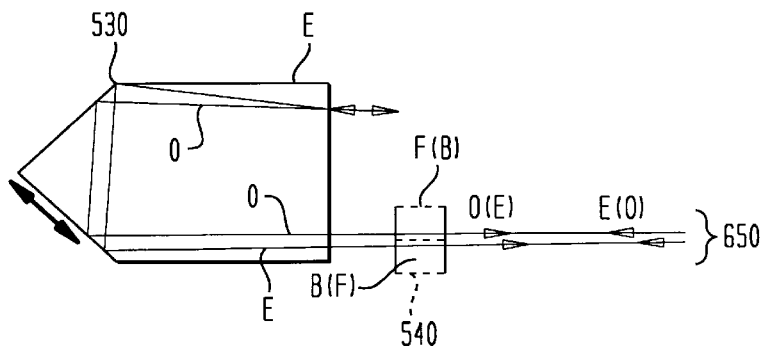

Referring to FIGS. 5(a) and 5(b), a top and side view is shown of reflexive fiber optic-dual parallel beam converter 500. Converter 500 comprises a reflexive walk-off device 530, which is coupled to a collimating device 520 on the top and a non-reciprocal polarization interchanger unit 540 on the bottom. Collimating device 520 is further coupled to a fiber optic pigtails 510 and non-reciprocal polarization interchanger unit 540 is further coupled to a remaining portion 550 of the optics system. Note that reflexive walk-off device 530 could also have an arrangement analogous to that shown in FIG. 7. Although the following is functionally described with respect to FIG. 6(a), it would be understood that the explanation is equally applicable to FIG. 6(b). Referring now to FIG. 6(a), where identical parts are identically numbered, a light beam enters reflexive walk-off device 530, where it is initially separated into E and O polarized beams. The beams emerge and enter non-reciprocal polarization interchanger unit 540, where the beams pass through either an F or B combination and either undergo or do not undergo polarization conversion. The beams then travel to the rest of the optics system.

Figure 7:
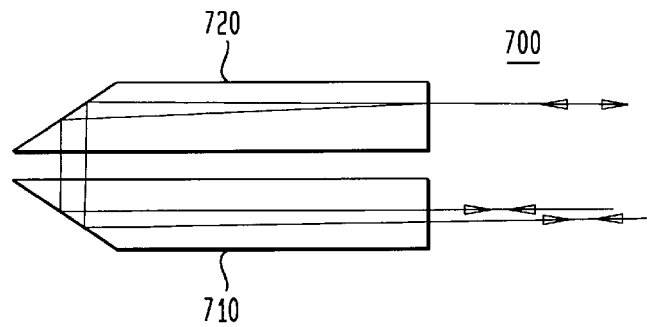

Actual implementation of the reflexive converter embodiments may prove easier by using birefringent materials having a maximum thickness of, for example, 3 millimeters. If the reflexive walk-off device needs to be thicker, it is possible to stack a multiple of the maximum thickness sheets together to obtain the required thickness. A disadvantage of this arrangement is that although the plates may have comparable thickness, the optical axes of the plates are orientated differently, one has to be careful to control the orientation of each plate individually. A further embodiment is shown in FIG. 7, where a portion of an optical circulator 700 consists of two plates 710 and 720, which together could, for example, represent the elements denoted as 330 (331) and 380 in FIG. 3.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed:

1. An optical apparatus, comprising:
   a first walk-off device having M input/output ports and M*2 output/input ports;
   a second walk-off device having M*2 input/output ports and N*2 output/input ports;
   a third walk-off device having N*2 input/output ports and N output/input ports;
   a first non-reciprocal polarization interchanger unit coupled to said M*2 output/input ports of said first walk-off device and to said M*2 input/output ports of said second walk-off device; and
   a second non-reciprocal polarization interchanger unit coupled to said N*2 output/input ports of said second walk-off device and to said N*2 input/output ports of said third walk-off device,
   wherein a direction of walk-off of said first walk-off device, of said second walk-off device and of said third walk-off device are in a same plane.

2. The optical apparatus according to claim 1, wherein said first walk-off device and said third walk-off device are matched in a magnitude of walk-off.

3. The optical apparatus according to claim 2, wherein a sense of direction of said walk-off of said first walk-off device is the same as a sense of direction of said walk-off of said third walk-off device.

4. The optical apparatus according to claim 3, wherein said sense of direction of said walk-off of said first walk-off device and of said walk-off of said third walk-of device is different from a sense of direction of said walk-off of said second walk-off device.

5. The optical apparatus according to claim 1, wherein said walk-off sense of direction of said first walk-off device, of said second walk-of device and of said third walk-off device are the same.

6. The optical apparatus according to claim 1, wherein each of said first non-reciprocal polarization interchanger unit and of said second non-reciprocal polarization interchanger unit performs a polarization conversion on a light beam when said light beam travels in a first direction and passes through said light beam without polarization conversion when traveling in a second direction.

7. The optical apparatus according to claim 1, wherein said first non-reciprocal polarization interchanger unit and said second non-reciprocal polarization interchanger unit includes a Faraday rotator.

8. The optical apparatus according to claim 1, wherein said first walk-off device, said second walk-off device and said third walk-off device are made from at least one birefringent material.

9. The optical apparatus according to claim 1, wherein at least one of said first non-reciprocal polarization interchanger unit and of said second non-reciprocal polarization interchanger unit includes an optically active material.

10. The optical apparatus according to claim 1, wherein at least one of said first non-reciprocal polarization interchanger unit and of said second non-reciprocal polarization interchanger unit includes an odd multiple half wave plate.

11. The optical apparatus according to claim 10, wherein said odd multiple half wave plate is a half wave plate.

12. The optical apparatus according to claim 1, wherein a light beam is prevented from emerging at an end port.

13. The optical apparatus according to claim 1, further including a plurality of reflective surfaces to form a reflexive configuration wherein light beams pass through said first walk-off device, said first non-reciprocal polarization interchanger unit, said second walk-off device, said plurality of reflective surfaces, said second walk-off device, said second non-reciprocal polarization interchanger unit and said third walk-off device.

14. The optical apparatus according to claim 13, wherein said at least one reflective surface and said second walk-off device are integrally formed.

15. The optical apparatus according to claim 1, wherein said first walk-off device and said third walk-off device are capable of separating an incoming light beam into two parallel light beams of orthogonal polarization or combining two parallel light beams of orthogonal polarization into one light beam, and said first non-reciprocal polarization interchanger unit and said second non-reciprocal polarization interchanger unit are capable of changing the polarization of one of said two beams so that the polarization of both beams exiting said first unit and said second unit are essentially the same or to change the polarization of one of said two incoming beams so that a single beam exits from said first and third walk-off devices.

16. An optical apparatus including M optical fibers coupled to M collimating means, comprising:
   a walk-off device having M input/output ports and M*2 output/input ports, said M input/output ports coupled to said M collimating means;
   a non-reciprocal polarization interchanger unit coupled to said M*2 output/input ports and to an optics system; and
   a plurality of reflective surfaces to form a reflexive configuration,
   wherein light beams from said M collimating means passes through said walk-off device, said reflective surface, said walk-off device and then said non-reciprocal polarization interchanger unit.

17. The optical apparatus according to claim 16, wherein said non-reciprocal polarization interchanger performs a polarization conversion on a light beam when said light beam travels in a first direction and passes through said light beam when traveling in a second direction without polarization conversion.

18. The optical apparatus according to claim 16, wherein said M collimating means is coupled to a first part of said walk-off device, and said non-reciprocal polarization interchanger unit is coupled to a second part of said walk-off device.

* * * * *